United States Patent [19]

Fullerton et al.

[11] Patent Number: 5,430,536
[45] Date of Patent: Jul. 4, 1995

[54] AUTOMATIC DUPLEX AND SIMPLEX DOCUMENT HANDLER FOR ELECTRONIC INPUT

[75] Inventors: Jack K. Fullerton, Webster; Charles F. Prevost, Rochester; Michele D. Taber, Rochester; James O. Mitchel, Rochester; Michael J. Martin, Hamlin; Richard A. Beck, Fairport, all of N.Y.

[73] Assignee: Xerox Corporation, Stamford, Conn.

[21] Appl. No.: 134,775

[22] Filed: Oct. 12, 1993

[51] Int. Cl.⁶ ............................................. G03G 15/00
[52] U.S. Cl. .................................. 355/320; 271/184; 355/308; 355/319
[58] Field of Search .............. 355/308, 309, 313, 318, 355/319, 320, 321, 322, 323; 271/184, 186

[56] References Cited

U.S. PATENT DOCUMENTS

| | | |
|---|---|---|
| 4,017,172 | 4/1977 | Lynch . |
| 4,066,252 | 1/1978 | Wick ......................................... 271/3 |
| 4,110,030 | 8/1978 | Knechtel . |
| 4,247,192 | 1/1981 | Komori et al. . |
| 4,312,587 | 1/1982 | Ariga et al. . |
| 4,318,609 | 3/1982 | Knechtel et al. . |
| 4,365,794 | 12/1982 | Roller ...................................... 271/186 |
| 4,395,118 | 7/1983 | Komor et al. . |
| 4,419,007 | 12/1983 | Kingsley . |
| 4,429,333 | 1/1984 | Davis et al. ............................ 358/293 |
| 4,456,236 | 6/1984 | Buddendeck ....................... 271/186 X |
| 4,456,369 | 6/1984 | Sato . |
| 4,515,458 | 5/1985 | Masuda et al. . |
| 4,536,077 | 8/1985 | Stoffel . |
| 4,571,636 | 2/1986 | Itoh ........................................ 358/285 |
| 4,579,325 | 4/1986 | Pinckney et al. ....................... 271/31 |
| 4,579,326 | 4/1986 | Pinckney et al. ....................... 271/31 |
| 4,621,801 | 11/1986 | Sanchez ............................... 271/251 |
| 4,669,853 | 6/1987 | Sosinski et al. ....................... 355/309 |
| 4,673,285 | 6/1987 | Shogren . |
| 4,884,097 | 11/1989 | Giannetti et al. . |
| 4,884,794 | 12/1989 | Dinatale et al. ................... 271/186 X |
| 4,916,493 | 4/1990 | DeVito ................................ 355/321 |
| 4,941,023 | 7/1990 | Holmes et al. ...................... 355/319 |
| 4,954,847 | 9/1990 | Murata et al. ...................... 355/318 |
| 4,984,779 | 1/1991 | Iwasaki ............................... 271/227 |
| 4,994,847 | 2/1991 | Tanaka et al. .................. 271/184 X |
| 5,000,438 | 3/1991 | Sardano et al. .................... 271/264 |
| 5,001,124 | 3/1991 | Patterson et al. ............... 514/236.8 |
| 5,014,976 | 5/1991 | Muck et al. ........................ 271/220 |
| 5,069,436 | 12/1991 | Lubberts ............................ 271/186 |
| 5,074,537 | 12/1991 | van Rijn ............................. 271/3.1 |
| 5,156,386 | 10/1992 | Kitajima et al. ................... 271/3.1 |
| 5,197,724 | 3/1993 | Kitajima et al. ................... 271/3.1 |
| 5,201,505 | 4/1993 | Shah ...................................... 271/3 |
| 5,203,554 | 4/1993 | Suzuki et al. ................... 271/186 X |
| 5,296,908 | 3/1994 | Hatano et al. ..................... 355/319 |

FOREIGN PATENT DOCUMENTS 55014429 2/1974 Japan .

OTHER PUBLICATIONS

Xerox Disclosure Journal vol. 8, No. 3, p. 263 May/Jun. 1983 Author: Richard E. Smith.

Primary Examiner—A. T. Grimley
Assistant Examiner—Sandra L. Brasë

[57] ABSTRACT

A document handling system particularly suitable for electronic imaging by sequentially feeding uppermost document sheets stacked in an input tray to be imaged in forward serial order at an imaging station and restacked collated in an output tray, with a short and compact "U" shaped common document feeding path also providing the majority of a duplex document feeding path for returning duplex document sheets imaged on their first sides back to the imaging station for imaging their second sides. The input and output trays are in a space saving closely superposed relationship defining a protective confining inverter chute space therebetween within which the duplex document sheets may be fed out over the output tray by a dual mode reversible output sheet feeder at the "U" shaped path output and then reversed to feed back through a short linear duplex document feeding path into the entrance of the same "U" shaped document sheet feeding path for simplex document sheets to provide a duplex loop path.

12 Claims, 1 Drawing Sheet

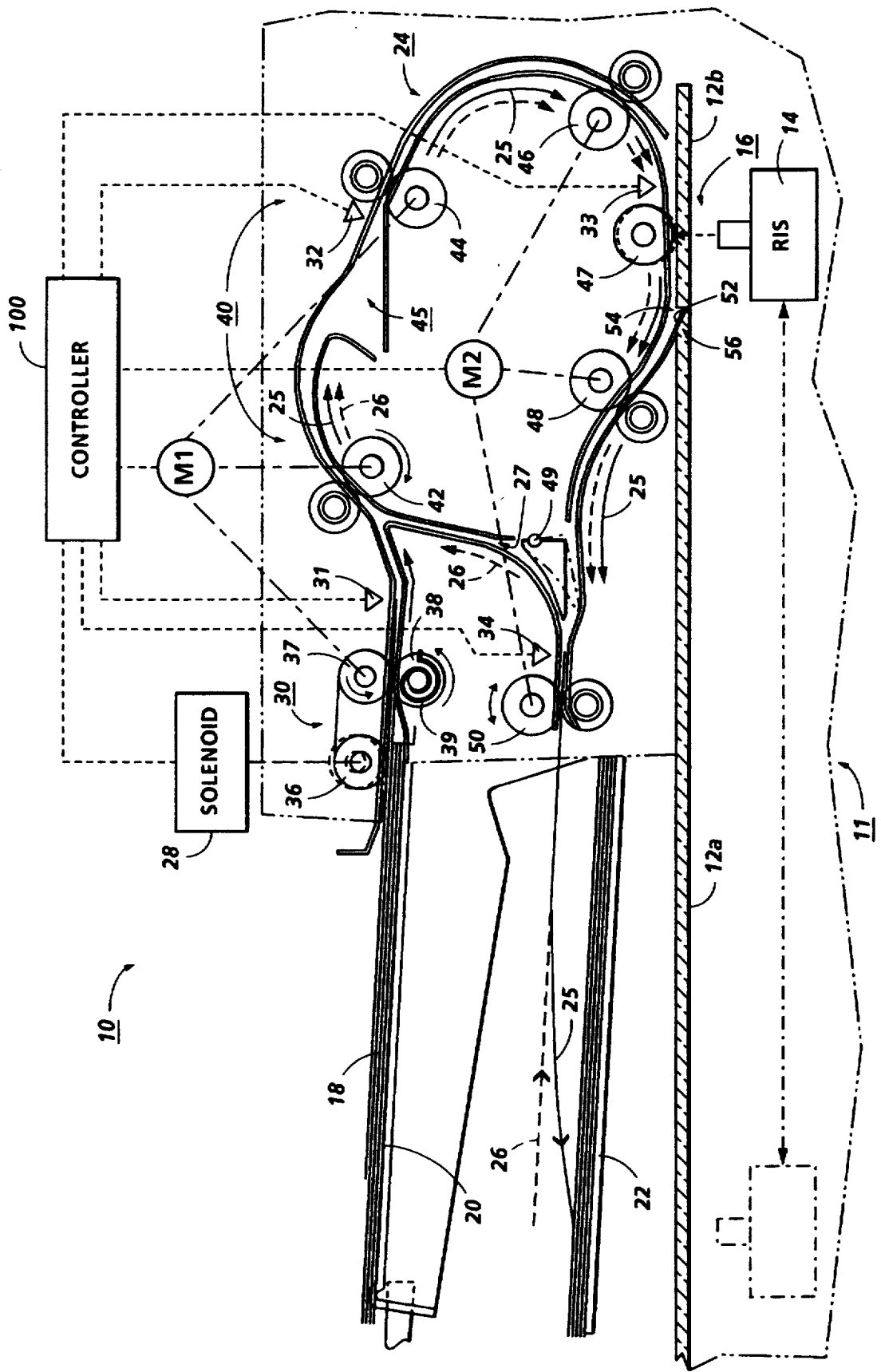

AUTOMATIC DUPLEX AND SIMPLEX DOCUMENT HANDLER FOR ELECTRONIC INPUT

Disclosed is an improved system for automatically feeding and imaging documents. More particularly, there is disclosed a very compact document handler for feeding and imaging sets of duplex (as well as simplex) document sheets.

The disclosed embodiment is particularly advantageous for reliably automatically feeding simplex and duplex document sheets to be electronically imaged from one or both sides in a digital copier, scanner, and/or facsimile machine in forward (1 to N) serial order with a very compact and low cost but reliable document handling apparatus.

The disclosed embodiment also allows moving document slot imaging with stationary optics, especially, for a comon electronic scanner which may be shared with a scanning platen with little additional cost or space.

Additionally disclosed in the embodiment herein is an overall compact document handler where the document input tray is closely overlying the document output tray, and having a desirably very short interconnecting document feeding path which does not require any undesirable highly arcuate or sharp bends in the paper path creating potential sheet jam sites, even for duplex document inversion and return for second side imaging. Together, the two superposed trays also help provide an additional function and feature, a space-saving and safety-enclosing inverter chute for extending portions of duplex documents which are being reversed for duplex document inversion by the reversible exit feeder nips which are normally fully ejecting sheets into the output tray. That is, a duplex sheet being inverted in this embodiment reverses in a substantially enclosed space provided over the top of any sheets in the document exit tray, but under the input tray, and does not need to extend out of the document handier or take additional footprint area or space.

More specifically, there is further disclosed in the specific embodiment herein an original image medium supplying apparatus for an original image medium moving exposure type image forming apparatus wherein a positional relationship between an optical exposure system and an imaging platen may be fixed, and the original image medium is exposed by the optical exposure system as it is fixed relative to the platen while the original image medium is carried at a constant speed through a carrying path; the original image medium supplying apparatus also comprising a tray section consisting of an original image medium supplying tray and an exhaust tray, that are positioned at an upper portion of a main body of the apparatus in an up/down relation; an original image medium supplying portion having a U-turn carrying path from the original image medium supplying tray to the same plane as the the platen; and an original image medium reversing section for reversing the original image medium after the exposure for an opposite surface of the medium to be exposed and then carrying it to the U-turn carrying path; wherein a space of the original image medium reversing section between the original image medium supplying tray and the original image medium exhaust tray is used as an original image medium reversing path for carrying the medium when the medium is reversed.

To further describe this feature of the disclosed embodiment in different words, there is shown an original image medium supplying apparatus for an image forming apparatus having both a platen scanning system and an original image medium moving exposure system, the platen scanning system being that the original image medium is set on a first platen and is exposed by an original image medium exposing apparatus, the original image medium moving exposure system being that a positional relationship between an exposure optical system and a second platen is fixed and the original image medium is exposed by an exposure optical system fixed relative to the second platen while the original image medium is carried at a constant speed through a carrying path; the original image medium supplying apparatus further comprising a tray section consisting of an original image medium supplying tray and an exhaust tray that are positioned above the first platen and in an up/down uneven relation, the tray section holding the medium above the platen; an original image medium supplying portion positioned adjacent to and separately from the tray section and having a U-turn carrying path from the original image medium supplying tray to the same place as the second platen; and an original image medium reversing section for reversing the original image medium after the exposure while an opposite surface of the medium is exposed, and then carrying it to the U-turn carrying path; wherein a space of the original medium reversing section between the original image medium supplying tray and the original image medium exhaust tray is used as an original image medium reversing path for carrying the medium when the medium is reversed.

By way of background, on the general subject of a duplex automatic document handler (DADF) with a stacking input tray at least partially overlying a stacking output tray and the platen, but for a light-lens copier, there is noted the Xerox Corporation "5034" copier document handler, and illustrative Xerox Corp. patents thereon such as U.S. Pat. Nos. 5,000,438 or 5,011,124. However it may be seen that this is disadvantageously an N to 1 system, with a bottom feeder, and the document path is longer and more complex, including feeding, stopping and refeeding the documents across a full width platen to the end of the output tray which is opposite from the input end of the input tray. Another DADF is disclosed in Xerox Corp. U.S. Pat. No. 4,941,023, and other art is noted therein on DADF's and their coordination with trayless duplex copy sheet loops.

Further by way of background, it is known that a CVT (constant velocity transport or moving document) scanner can provide rapid (and more closely spaced) document exchange times at the imaging station, to help, e.g., provide scanning at greater than 50 scanned documents per minute. Xerox Corporation has made CVT [slit scan] type document handlers for copiers with otherwise normal large stationary document moving optics platens, such the Xerox Corporation "3100 LDC" [see, e.g., U.S. Pat. No. 4,017,172 issued Apr. 12, 1977 to Thomas Lynch]; and even earlier CVT only large document or engineering drawing copiers. A recent example of a Xerox Corporation commercial large document copier with a dual nip and dual speed reversible CVT is disclosed in U.S. Pat. No. 4,996,556 (D/89229) issued Feb. 26, 1991 to G. A. Grey, Jr.

There is extensive art on two tray simplex or duplex document feeders for light-lens copiers in which the documents are fed by a constant velocity transport (CVT) past a narrow scanning slot, which is usually a separate imaging station or window, separate from the large platen used to scan stationary documents, including books. Some examples include Canon U.S. Pat. Nos. 4,312,587; 4,110,030; 4,247,192; 4,456,369; 4,515,458; 4,318,609; and 4,395,118. The latter two are examples of CVT document imaging systems adjacent to the platen where the platen scanning carriage can be moved to and parked at the CVT document imaging position for alternative imaging there.

Of particular interest is patent art on CVT duplex (both sides imaged) document handlers specifically for electronic (digital) imaging with a raster input scanner (RIS). ARIS may be either of the full width array (FWA) type, or a smaller RIS CCD array or chip with lens image reduction. Scanners may be separate units, or may be an element of a digital copier if scanning and printing are done on an integral or modular unit at the same location. Patents on duplex document handlers specifically for RIS or other scanners (otherwise known as "electronic front ends", or EFE's) particularly include Xerox Corp. U.S. Pat. No. 4,536,077 issued Aug. 20, 1985 to James C. Stoffel. Also, a Xerox Disclosure Journal (XDJ) publication dated May/June 1983 by Richard E. Smith, Vol. 8, No. 3, p. 263. [Both, however, have two separate imaging stations for the two sides of the duplex document, and the latter shows two RIS's]. Also, Xerox Corp. U.S. Pat. No. 4,673,285 issued 1987 to Shogren; and Mead Corp. Davis et al, U.S. Pat. No. 4,429,333, issued in 1984. Said Davis, et al, U.S. Pat. No. 4,429,333 also uses the same CCD array carriage (RIS) for both the duplex CVT image station as for platen scanning, in the same plane, although the two imaging areas are separated. Said U.S. Pat. No. 4,536,077 (D/82114) scans the nth side while the document is moving toward the platen and then scans the nth minus 1 side while the document moves onto the platen. Also noted is U.S. Pat. No. 4,571,636, assigned to Fuji Xerox, issued Feb. 18, 1986, filed Dec. 21, 1983, based on Japanese App. 57-222904 filed Dec. 21, 1982, entitled "Device for reading images of both surfaces of an original in one pass", by Itoh, Satoru.

Also disclosed in the cited CVT references are twin-nip CVTs moving the document past a stationary RIS between CVT nips on opposite sides of the RIS. A dual speed (fast document return) dual nip CVT is disclosed in an XDJ publication dated November/December 1979 by Vaidevutis Draugelis, Vol. 4, No. 6, pp. 743-4. Furthermore, by using angled CVT nips the document can be arcuately deformed between the two nips towards the RIS to provide sheet beam strength and more positive sheet engagement against the RIS platen or slit.

A sheet buckle formed ahead of a CVT nip for the RIS is disclosed in Xerox Corp. U.S. Pat. No. 4,451,030 (D/81012) by D. Teeter, et al.

Earlier light-lens CVT duplex document copying patents cited in said Stoffel U.S. Pat. No. 4,536,077 include Xerox Corp. U.S. Pat. No. 3,980,406 issued 1976 to Lang, U.S. Pat. No. 3,998,543 issued 1976 to Wick et al and U.S. Pat. No. 4,035,073 issued 1977 to DelVecchio. Also, Agfa Gevaert U.S. Pat. No. 4,261,661 issued 1981 to Theirs. Also, Xerox U.S. Pat. No. 3,868,654 issued Oct. 29, 1974 to Joachim Gunther, which itself in Col. 1 notes even earlier duplex document copying art on a single (or shared) optical path and document reversal after first side imaging: U.S. Pat. Nos. 3,227,444; 2,472,931 and 2,304,273.

Xerox Corporation U.S. Pat. No. 4,459,013 issued Jul. 10, 1984 to T. J. Hamlin and C. L. George (D/76569) is of interest as showing in its principal embodiment a single CVT narrow platen imaging station recirculating document handler, in which all documents are fed from the bottom of the stack in a single tray, but simplex documents are returned from one side of the tray and duplex documents are normally returned to the other side of the tray, for CVT copying of both sides and proper inversions. An adjacent but separate full size manual scanning platen is also disclosed.

By way of further background art on various other document feeders specifically for electronic (digital) imaging, they include Xerox Corporation U.S. U.S. Pat. Nos. 5,026,044 (D/90006); 4,506,301 (filed Oct. 12, 1979, re the Xerox GIS 150 product in the Library of Congress); U.S. Pat. Nos. 4,536,077; 4,380,389; 4,451,030; 4,451,030; 4,496,984; and 4,607,951. Also, U.S. Pat. No. 4,295,167 (FIG. 5 especially) or related U.S. Pat. Nos. 4,287,536 (D/79039); 4,496,984; 4,471,386 (D/81132); 4,471,386 (D/81132); and 4,447,830 (D/80153) (the latter three show simple straight-through document feeding rather than a folded or inverting document path). Also, Xerox Corp. U.S. Pat. Nos. 4,743,974 (D/86183); and 4,967,233 (D/89023).

Also noted is a Ricoh DH scanner input, Japanese Patent Sho 62-111838, filed Nov. 8, 1985. An example of a common scanner product is the "Discover 320" Scanner sold by Kurzweil Computer Products (a Xerox company) since some time after 1985. Also, the Canon NP-9030 product [1985?] was a 400 spi digital copier with a ADH/RDH RF-1 which was presumably the same as the the regular Canon light-lens RDH wide belt platen transport. Sharp Electronics says that its newly announced FO-5400 is the first machine that allows faxing of double-sided documents by scanning the original twice and faxing pages in proper order.

Also noted is Konishiroku U.S. Pat. No. 4,380,387, originally filed Jun. 21, 1979, with a document scanner switchable between conventional optical input and electronic input, as for FAX. The German equivalent is OLS 29 25 751 published Jan. 1, 1980. This is an early teaching of document input for light-lens or EFE, as several subsequent document handler patents do expressly, e.g. Xerox Corp. U.S. Pat. No. 4,673,285 above and U.S. Pat. No. 5,078,379 at Col. 2 Para. 3 (D/88274C).

Further by way of background, it is known that combined facsimile and/or digital scanning for copying and printing or disk storage (and even even conventional light lens alternative copying) can be provided in one single unit, which may be encompassed by the term "printer", and are known as "multimode" or "combo" machines. Xerox Corporation U.S. Pat. No. 3,597,071, filed Aug. 30, 1968 and issued Jul. 27, 1971, on a "Diverse-Input System" generally shows and/or suggests mutimode or mutifunction machines for document or electronic imaging and transmission, with input for printing or facsimile selectably interfaced to a (flexible modular) printer/copier, for remote or local copying. Other patents include Xerox Corporation U.S. Pat. No. 4,947,345 filed Jul. 25, 1989 and issued Aug. 7, 1990 to Paradise, et al.; IBM Corp. U.S. Pat. No. 4,623,244, issued Nov. 18, 1986 to D. R. Andrews, et al., originally filed Oct. 4, 1976 (see, e.g., Col. 55); U.S. Pat. No.

3,597,071, filed Aug. 30, 1968 and issued Jul. 27, 1971 to Jones; Fuji Xerox Co. Ltd. U.S. Pat. No. 5,038,218, issued Aug. 6, 1991 to Matsumoto; and Sharp U.S. Pat. No. 5,021,892, issued Jun. 4, 1991 to Kita, et al. Such plural mode, combination or systems printers are also commercially available, e.g., the Xerox Corporation "DocuTech" printing systems, the Eastman Kodak "LionHeart" systems, the Fuji Xerox Co. Ltd. "Able" TM machine series (Able TM 3311, etc. and Xerox U.S. 3010), the Canon "Navigator", the Okidata "Doc●It" multifunctional (" combo") product announced Oct. 28, 1992, the Xerox Corp. "7033" LAN fax server, scanner, copier, LAN print server, and/or digital printer—all in one network-ready unit, the Ricoh DS5330, the Cannon GP55 series, and the Ricoh MV715(1993).

As to duplex document handlers for light lens copiers with dual mode document exit rollers which are reversible for inverting duplex documents, these are used, for example, in the Xerox Corporation "1065" copier. They are also shown in Xerox Corporation U.S. Pat. Nos. 4,579,326; 4,579,325 and 4,621,801. Dual mode reversible copy sheet (not document) exit rollers are in the Xerox Corporation "5034" copier, for duplex copying, as also shown in Xerox Corporation U.S. Pat. Nos. 5,014,976 and 4,916,493, and earlier art cited therein.

By way of explanation, 1 to N or forward page order document sequencing is preferred for electronic (RIS or EFE) document input for several reasons. First, 1-N feeding desirably facilitates employing a top feeder with face-up document input stacking. Top sheet feeding enables higher sheet capacities, better sheet separation and feeding reliability, and less smear generation. That is, as compared to a bottom of stack sheet separator/feeder, where each sheet has to be pulled out from under the weight of the stack. Secondly, 1 to N document input eliminates a non-copying document counting circulation or "precount cycle" for simplex to duplex copying (to make duplex copies from either odd or even numbers of simplex originals). Thirdly, 1 to N input enables correct automatic page numbering concurrently with page image input. Fourthly, it is compatible with existing printer architectures and existing FAX standards, and thus enables one common document handler to be used for both digital copying and FAX. Fifthly, with 1 to N document input, there is no incoming data stream delay before job printing can be started and tested. That is especially important if documents with detailed graphics, or other high pixel count files, are being transmitted by telephone lines or other relatively low bandwidth (and thus low baud rate) communication systems. 1 to N sequencing is also compatible with most electronic filing software.

Note, however, that the document handler disclosed herein could, if desired, alternatively be used for N to 1 order document feeding simply by using an above-cited bottom of stack sheet feeder and face up document stacking in the input tray.

As to specific components of the disclosed embodiment, other art of background interest includes art on active retard system sheet separator/feeders, in particular those using spring reverse driven retard rolls. That includes sheet feeders in the Xerox Corp. 1992 "5318", "5320" and "5322" copiers; Savin U.S. Pat. No. 4,368,881; and Konica U.S. Pat. No. 5,039,080 to S. Kato et al. The former also teach a lifting nudger roller upstream of the retard nip and/or other normal force feedback change, for improved multifeed separation.

This type of separator/feeder is desirably utilized, as in the example here for high reliability [low double-feeds rate] top feeding. Other known top retard feeders in which the upstream nudger roll is lifted up off the stack by a solenoid when a sensor detects a successful sheet feed captured in the downstream take-away rolls nip include Xerox Corp. U.S. Pat. Nos. 4,561,644 and 4,475,732; and Toshiba U.S. Pat. No. 5,219,156. Other sheet retard feeders with various means for reverse driving the retard roller to feed back the retarded sheets include Van Dalen U.S. 3,108,801 cited in Xerox Corp. U.S. Pat. No. 4,203,586; Weber U.S. Pat. No. 2,979,330 and Minolta U.S. Pat. No. 4,801,134.

By way of general background, as scanners, printers, copiers and/or plural-mode integral such devices or systems increase in speed, and become more automatic, it is increasingly important to provide higher speed yet more reliable and more automatic handling of the document sheets being imaged and/or copied, i.e. the document input. It is desirable to reliably feed and register document sheets sequentially from stacks of document sheets, which may present a variety or mixture of sizes, types, weights, thickness, materials, conditions and susceptibility to damage. "Originals" are often previous copies. Documents may have curls, wrinkles, tears, "dog-ears", cut-outs, overlays, tape, paste-ups, punched holes, staples, adhesive or slippery areas, or other irregularities. Yet, with stack sheet feeding, it is very desirable to provide minimal double-feeding (mis-separations), misfeeding, or skewing, and minimal document jamming, wear or damage. Original document handling, particularly for delicate, valuable, thick or irregular documents, is often more difficult and critical than feeding blank or virgin copy sheets. Documents may have typing, smearable inks, freshly printed ink jet printer output, fuser oil or other materials thereon susceptible of smearing or contamination of other documents or machine components by the sheet separation and feeding process. The image materials (and/or its fusing), can change the sheet feeding characteristics.

Avoidance of sheet skewing during feeding and maintaining proper registration and timing of documents is also important. If the document is not properly fed and registered, then undesirable dark borders and/or edge shadow images may appear on the ensuing copy sheet, or information near an edge of the document may be lost, i.e., not copied onto the copy sheet. Document misregistration, especially skewing, can also adversely affect further feeding, ejection, and/or restacking of the documents. Long sheet paths aggravate this problem. [However, electronic image rotation for skew correction is known.]

Even with slower copying rate copiers or scanners, it has become increasingly desirable to provide an automatic document handler (ADH) or feeder (ADF) for automatic sheet feeding from a stack of documents, with the document handler providing all the deskewing, feeding and final registration of the documents into the imaging position, and then ejecting and restacking the documents automatically.

A preferable document handling system is one that utilizes an existing or generally conventional optical imaging system, including the external transparent copying window (known as the platen or imaging station) of the copier or scanner. It is also desirable that the document handling system be readily removable, as by pivoting away, to alternatively allow the copier operator to conventionally manually place documents, including books, on the copying platen. Thus, a compact and light weight document handler is desirable.

Document handlers may be operated and controlled with known control systems. Some additional examples of various prior art copiers with document handlers and control systems therefor, including sheet detecting switches, sensors, etc., are disclosed in U.S. Pat. Nos. 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. It is well known in general and preferable to program and execute such control functions and logic with conventional software instructions for conventional microprocessors. This is taught by the above and other patents and various commercial copiers. Such software may of course vary depending on the particular function and the particular software system and the particular microprocessor or microcomputer system being utilized, but will be available to or readily programmable by those skilled in the applicable arts without undue experimentation from either verbal functional descriptions, such as those provided herein, or prior knowledge of those functions which are conventional, together with general knowledge in the software and computer arts. E.g., *In re Hayes Microcomputer Products Inc. Patent Litigation* (Fed. Cir. 1992). Controls may alternatively be provided utilizing various other known or suitable hardwired logic or switching systems.

In the description herein the term "document" or "sheet" refers to a usually flimsy sheet of paper, plastic, or other such conventional individual image substrate, and not to microfilm or electronic images which are generally much easier to manipulate. The "document" is the sheet (original or previous copy) being imaged. A "simplex" document (or copy sheet) is one having its image and page number on only one side or face of the sheet, whereas a "duplex" document (or copy sheet) has "pages", and normally images, on both sides, i.e., each duplex document is considered to have two opposing sides, faces, or "pages" even though no physical page number may be present.

As to specific hardware components of the subject apparatus, or alternatives therefor, it will be appreciated that, as is normally the case, some such specific hardware components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below, as well as the claims. Thus, the present invention will be better understood from this description, including the drawing figure (approximately to scale) wherein:

The Figure is a partially schematic front view of one embodiment of an exemplary highly compact document handling system for electronically inputting duplex as well as simplex documents in 1 to N order.

Describing now in further detail the exemplary embodiment with reference to the Figure, there is shown an exemplary document handler 10 providing the advantageous features noted above for an electronic copier or scanner. The exemplary document handling system disclosed here includes a desirable small loop document path. It also provides "immediate" type duplex document inversion with the duplex sheet inverter chute path located over the top of the stack in the return or exit tray and under the input tray. The input tray is for face up stacking, for 1 to N top sheet feeding, and the output tray is stacking the documents 1 to N face down after imaging. The document path here also includes simple sheet buckling lead edge registration deskew in a buckle chamber also provided in the document path.

In the example of the Figure, there is shown a highly compact and lightweight document handler 10 which may be a part of an optional or add-on top module 11 of a convertible digital copier/scanner unit (not shown). The document handler 10 is desirably pivotable along a pivot axis at the rear of the module 11. That is common and typical for document handlers, so as to expose a large (document size) imaging platen for the manual placement of documents stationarily thereon. Here, a platen 12 is provided with such a large platen portion 12a, which is scanned by a rastor input scanner or RIS 14, also part of the module 11. The entire scanner or input module 11, including the platen 12 and the RIS 14 desirably may be a removable top module so that the underlying processor or printer unit may alternatively be used as a stand alone or remote digital printer for remote electronic input. With the top module 11, including the document handler 10, mounted on the digital printer unit, the integrated unit provides a fully integrated convenience copier which even a casual operator may use simply by placing documents 18 in a document input tray 20 and automatically copying them at an imaging station 16 as if this were a normal light lens copier rather than a digital copier. Alternatively, the same document input at imaging station 16 [or platen portion 12a] provided here may also be easily used for facsimile transmissions. In that case the documents 18 will be similarly electronic imaged by RIS 14, but then transmitted over telephone lines or other communications media, with or without electronic storage or buffering. Only the relevant portions of the digital copier top module 11 and its document handler 10 need be illustrated here since the digital printer or copy processor on which it may be mounted may be any of various known, conventional, or new electronic printer units, which do not per se form part of this invention, and therefore need not be described.

As may be seen, substantially the entire document handler 10 overlies the platen 12, so as to not require any additional office space or "footprint" lateral dimensions. A further feature of the system disclosed herein is that the same RIS 14 may be utilized for scanning documents manually placed on the platen portion 12a as well as documents which are automatically fed to be imaged on platen portion 12b by the document handler 10. This is provided here by a two part platen 12 comprising a full size scanning platen portion 12a and a narrow slit scanning portion 12b. As may be seen, these two platen portions 12a and 12b are preferably closely adjacent one another and in the same plane and utilize the same frame mounting and/or alignment system. The two document trays 20, 22 may thus also overlay the platen portion 12a rather than extend the machine footprint. While the two portions 12a and 12b of the platen could be monolithic or integral, they are preferably in two parts for advantageous reasons which will be subsequently explained herein.

The document handler 10 feeds documents to be imaged at a constant velocity with a CVT past a scanning or slit image station 16 which is at the slit scanning platen portion 12b, as shown. For this document handler 10 document imaging, the RIS 14 is "parked" at this imaging station 16. Desirably, this movement of the RIS into the imaging station 16 position is merely a slight extension of the normal scanning travel of the RIS back and forth under the full size scanning platen portion 12a. That is, the RIS 14 is simply moved slightly further in the same plane beyond the end of the manual document placement position on platen portion 12a at one end thereof. Thus, the same RIS 14 movement drive and track or rails may be utilized at little or no increase in cost.

As noted, documents 18 are loaded face up in normal order in the document input tray 20 of the document handler 10 when automatic document input is desired. The stack of documents is then sequentially fed from the input tray 20 through a short, highly compact, "U" shaped document path 24 for imaging at the imaging station 16, and then after one imaging the simplex documents are fed directly on to a document output tray 22 in which the documents are restacked face down. However, as will be described, there is a partial difference in the document paths provided for simplex documents as compared to duplex documents. This is illustrated here by solid arrows representing the simplex document path 25 and dashed line arrows representing the duplex path 26. Note, however, that both simplex and duplex documents are ejected and restacked in the same document output tray 22 here, in the same manner, after their copying is completed.

It is important to note that the document input tray 20 is closely superimposed above the document output tray 22. That is, these two trays closely overly one another to form a relatively enclosed space between the two trays. Yet, both trays are readily operator accessible. This space between the two trays 20 and 22 provides a protective and space saving inverter chute for duplex documents which are being inverted between the copying of their first and second sides.

Note that the U-shaped document path 24 contains a single natural inversion for turning each document sheet over once between its infeeding from input tray 20 and the imaging station 16. This is the only inversion in this document path 24. And there is no inversion in the duplex path 27 added portions. The document path 24 is like a "U" lying on its side, facing and connecting with the input tray 20 and output tray 22 at the upper and lower ends of the "U", and with the imaging station 16 on the bottom side of the "U". It may also be seen that the duplex document path 27 utilizes the same U-shaped document path 24 shared by both simplex and duplex documents, but additionally provides a short duplex documents return path from the output end of the U-shaped document path 24 back to the input of that path 24, as will be further described.

All of the document sheet feeding in the document path 24, including the duplex document path 27 portions, and the imaging station 16, are all provided in this example by only two drive motors, a first drive motor M1 and a second drive motor M2, respectively connected to the various document path sheet feeders as illustrated by the illustrated connecting dashed lines. Both of the drive motors M1 and M2 and a solenoid 28 (for selectively lifting the nudger roll of the input feeder), are controlled by a controller 100, which may be of the type known in the prior art previously noted above. Also connecting with the controller 100 in a conventional manner are sheet path sensors for detecting the lead and/or trail edge of document sheets being fed through the document path 24, 27 such as the illustrated sensors 31, 32, 33, and 34.

The solenoid 28 is connected to that portion of a top sheet separator/feeder 30 which sequentially feeds the top sheet of the stack of documents loaded in the input tray 20 into the U shaped document path 24, and separates each fed sheet from the respective underlying sheets. The sheet separator/feeder 30 may be driven by the motor M1, as shown. Reference is made to the above-cited patents on retard separator feeders of this type. For electronic imaging, since the documents need not be recirculated, positive separation is particularly important to prevent multifeeds, which would result in missed document images which are not immediately detectable, especially if the copies are being printed remotely. Accordingly there is preferably provided in this separator feeder 30 a nudger roll which is cyclicly lowered by solenoid 28 onto the top of the stack for feeding or advancing the top sheet or sheets 18 into a positive retard separating nip. Here, the retard nip comprises a driven first feed roll 37 and an undriven retard roll 38. The driven feed roll 37 rotates to feed the topmost sheet at that point in time downstream into the document path 24, while subsequent or underlying sheets are retarded by the frictional retard roll 38 forming a nip therewith. To prevent wear spots or the like on the retard roll 38, the roller 38 is allowed some limited rotational movement forward or downstream. However, this roller 38 downstream rotation is resisted by a connected return spring 39, which spring 39 is wound up by roller 38 downstream rotation due to the high friction between rollers 37 and 38 when they are directly engaged (with no sheets therebetween). Whenever two or more sheets are in the retard nip between the rolls 37 and 38, the wound-up return spring 39 force is strong enough to overcome the (lesser) friction between the plural sheets in the nip, to push back upstream the underlying sheets, providing improved separation as further explained in the above-cited references. Once the top sheet has been fully acquired and fed downstream past the sensor 31, the nudger 36 may be lifted to prevent inadvertent further feeding therewith of an underlying sheet, and prevent smearing of document images of smearable ink or unfused toner. By using solenoid 28 lifting of the nudger roll 36 promptly after sheet acquisition is sensed at the sheet input sensor 31 adjacent the input tray 20, rather than camming the nudger roll, variable (optimized) timing may be provided for minimal nudger roll engagement and hence minimal potential smearing. The initial sheet input velocity is preferably faster than the normal CVT velocity in the main portion of the document path. That higher initial velocity enables the lead edge of the (next) document being inputted to catch up with (close or minimize the interdocument pitch or gap with) the trail edge of the previous document in the document path.

Once a top sheet has been separated and fed into the document path 24 as described above, it then enters the regular document path sheet drive system 40. This will be described here with reference to the driven rollers, although the mating and nip-defining idler rollers are also illustrated. As shown, these document path sheet drive rollers of this example comprise, in order: second or take-away rolls 42, registration (stalled) rollers 44 downstream thereof, with an intermediate sheet deskew buckle chamber 45 therebetween, then first CVT rolls 46, then an imaging station 16 overlying or sheet holddown roller 47, then second CVT rolls 48, and then (after passing a pivotal gate 49) reversible exit nip rolls 50 at the entrance to the output tray 22. Note that the latter three sheet path drive rollers (46, 48, and 50) are illustrated as driven by the motor M2, which is preferably a reversible servo-motor for controlled driving of these rolls and particularly to provide the accurate constant velocity desired for imaging for the CVT rolls 46 and 48. This drive M2 may (optionally) be shared if no sheets are in the CVT nips at times when rollers 50 are reversed, or if an electromechanical friction clutch allows feeding of long sheets [14–17 inches] with rollers 50 reversal. Or, a separate motor may be provided for rollers 50.

The illustrated imaging station roller 47 may be an undriven gravity or spring loaded idler roller, and may also provide, or be associated with, an imaging background surface for appropriate image background for the document being imaged at that point. (Alternatively, a floating sheet backing plate may be used instead.) It provides the control of the document being imaged to maintain all of document within the depth of field and focus of the imaging system as the document passes through the imaging station, i.e., to maintain a uniform restricted (very narrow height) maximum spacing gap above the imaging plane at the platen upper surface, of, e.g., 0.5 mm. Some additional or alternative features are discussed below.

One additional feature relates to the imaging station 16 roller 47. This undriven roller 47 surface desirably does not need to actually touch or nip with the upper surface of the platen in the imaging area as long as the document is held within the depth of field or focus of the imager (RIS) 14, e.g., within approximately one-half mm. This spacing is desirably allowed by a flexible or floating mounting for the roller 47. The roller 47 preferable has a smooth cylindrical outer surface, and slightly larger diameter ends. These slightly larger ends of this floating roller engage the platen surface outside the imaging area, and thus automatically set and maintain the desired close spacing of the rest of the roller away from the platen surface by that slight difference in diameter, irrespective of variations in the mounting alignment of the rest of the document handler unit. These slightly enlarged spacing or registration ends may be provided by overlaid thin plastic bands. Thus, document sheets feed under the roller 47 are held to within less than approximately 0.5 millimeter of the platen upper surface, yet neither the document nor the roller need rub or be pressed directly against the platen surface. This reduces platen wear and sheet feeding resistance.

As another additional feature, at least that portion of the imaging station roller 47 surface within which the lead edge and side edges of various documents are to be detected may be a smooth polished metal surface. That provides a spectral reflection, for increased contrast with, and thus improved detection, of the document edges as they pass under this roller surface.

The imaging station roller 47 may, alternatively, be driven, to provide a single driven roll CVT imaging system, as an alternative to the illustrated dual (upstream 46 and downstream 48) driven nips CVT system. In such a single driven CVT nip alternative, where the roller 47 must provide non-slip document feeding, the roller 47 may be provided with slightly larger diameter frictional drive surfaces centrally thereof, as by thin elastomer bands, centrally located, around the roller 47. These bands can provide such frictional document feeding, but will not interfere with the above-described document edge detection (especially in a center-registered document feeding system) if they are not located in the document image edge areas under the roller.

Center registration and feeding of all documents can be conventionally provided by a well-known dual rack and pinion connection of the side-guides of the document input tray 20, so that the side guides automatically move together to always center the document stack irrespective of the size of the loaded documents.

Turning now to another optional feature, for selectably enlarging certain original documents into enlarged copies on larger copy sheets, and/or enlarged partial images, without losing image resolution, it may be desirable to scan the document more finely by moving the document more slowly relative to the RIS 14. Thus, switching to a slower CVT document drive velocity may be optionally provided, e.g., one-half speed, or even one quarter speed. Depending on the selected enlargement and copy sheet size, or for other purposes, it may be desirable to know in advance of that speed change the dimension(s) of the original document, especially in the CVT feeding and scanning direction. That is, to know the document size before the lead edge of that document reaches the imaging station 16. If the scanning speed of the CVT is to be changed, it needs to be done before the lead edge of the document enters the imaging station. However, the document handler 10 desirably has a very short document path length, such that the trail edge of a large document will not have cleared the document input sensor 31 before the lead edge of that same large document enters the imaging station 16, or, more importantly, the lead edge detector 33 just upstream of the imaging station 16.

Accordingly, a document size detection system and algorithm can be provided as follows: A normal (smaller size) document trail edge can actuate the sensor 31 adjacent the document input tray 20 before the (present-known) path velocity of the document handler and the (known) time will actuate sensor 33 with the lead edge of that document before it reaches the imaging station. Thus, in this case of smaller documents, the input sensor 31 adjacent the input tray also provides a document dimension signal which may be used in connection with printing controller information on the degree of desired image enlargement and/or selected and/or automatically selectable available copy sheet size to decide whether or not to change the CVT velocity, and/or by what extent.

If, however, the document dimension in the document feeding direction exceeds the document path distance (and thus time) from the document input sensor 31 to the imaging station input sensor 33, then another document dimension estimating or measuring system is needed before then if said CVT velocity change is to be provided based in part on the document size.

One such system is to measure (sense) the document input tray side guide settings, and to use that measurement to estimate the other (orthogonal) dimension of the documents in a known manner from a look-up table stored in memory of standard sizes of sheets. Noted are Xerox Corporation U.S. Pat. Nos. 4,579,444, 4,745,438 (e.g. Col. 11), U.S. Pat. Nos. 3,689,143, and 4,351,606; also U.S. Pat. Nos. 4,277,163 and 4,406,537 of others.

[Also noted is Xerox Disclosure Journal Vol. 11, No. 2, p. 89, dated March/April 1986, by William A. Henry, II].

The above system may also be generally used in other document handling systems for feeding documents for a stack of documents from a tray to an imaging station for imaging, where information as to the size of the document being fed to the imaging station is needed before the start of said imaging of said document, where said tray has an adjacent document edge sheet sensor, but the distance between said document input sensor and said imaging station is such that the end of a large document will not have cleared said sensor when the lead edge of that same document reaches said imaging station.

The gate 49 is located at the downstream end of the U-shaped document path 24, just upstream of the reversible exit nip rolls 50 and at the entrance of the duplex document path 27. The gate 49 does not obstruct documents coming from the imaging station 16, irrespective of whether they are duplex or simplex documents.

All documents here go directly past the imaging station 16 into the nip of the exit rolls 50. Simplex documents are fed on by these rolls 50 without any reversal thereof out into the exit tray 22 for restacking there in proper collated page order. That is, stacking face down in 1 to N order, since the documents were fed face up in 1 to N order from the input tray 20 and were inverted once in the U-shaped document path 24.

However, for duplex documents which have been imaged on their first side and are yet to be imaged on their second side, as soon as the trail edge of the duplex document passes the sensor 34, the controller 100 directs the reversal of the exit rolls 50. The duplex document sheet at that point is extending substantially (for most of its length) out into the above-described inverter chute space between the trays 20 and 22. That duplex document sheet is now rapidly reversed (feeding much faster than the CVT velocity) to be drawn back into the document handler toward the gate 49 by reversing rollers 50 at that point. The gate 49 is either solenoid or cam actuated or gravity loaded at this point into a position in which, as shown in phantom, the reversed duplex document is directed up into the duplex path 27. This duplex path 27 forms a return path of the duplex documents into the entrance of the U-shaped path 24, as previously noted.

The combined duplex documents path 24, 27 provides a complete loop, as may be seen. This complete duplexing loop 24, 27 is quite small and compact. Desirably, it has dimensions only slightly larger than that of the longest document dimension to be fed therethrough. That is, this system is operative as long as the trail edge of the duplex document being inverted clears the sensor 34 before the lead edge of that same document sheet returns to the sensor 34 through the loop path 27, 24 after having its second side imaged at the imaging station 16. The duplex loop path length is preferably long enough for a U.S. standard 17 inch (approximately 43 cm.) duplex document to be fed short edge first. I.e., so that the head of the 17" or other longest document to be imaged doesn't hit the pre-exit sensor 34 until the tail of that long document clears that sensor 34.

This refeeding of duplex document sheets through the path 24 for second side imaging turns those document sheets over a second time. For proper collated output into the output tray 22, the duplex documents may be reinverted before restacking by being again fed back through the same path 27, 24 in the same manner, utilizing the same reversal of the exit rolls 50, but passing through without imaging, and then ejected (by not reversing the exit rolls 50). Thus, the duplex document is then ejected, properly oriented face down, into the output tray 22. Face down output for duplex documents is, of course, with the first or odd side page down, since this is a 1 to N system.

Referring to the duplex document scanning sequences available, the simplest sequencing algorithm is to process all documents in a simple 1 to N sequence, including "immediate duplex" sequencing of duplex originals. That is, side 2 of each duplex document may be scanned directly after side 1, followed by side 1 of the next fed document, etc.. [Thus, one does not have to have 2 sheets in a document path at once.] The duplex document scanning sequence here may thus be side 1 of 1, skip, side 2 of 1, skip, side 1 of 3, skip, etc., relative to a normal inter-document gap for simplex documents feeding in this example of approximately 30 mm. Each "skip" is for inverting the document by reversal of the exit rolls to feed that sheet back through the clockwise CVT path loop again; first for imaging its second side, and then for a non-imaging pass of the document sheet for re-inverting it again for proper output stacking. There is no need for deskew, constant velocity, or slowing down for CVT scan in this non-imaging pass. Thus, this third, non-imaging, document loop pass is desirably at a substantially higher (slew rate) velocity, to save time and increase overall duplex productivity. Three inversions of each document are provided in this example for face down restacking in the output tray in collated order. As noted, after the duplex sheet is fed through the document path for the third time, it returns back to the reversible exit rolls for the last time and is ejected. Duplex document scanning in this manner is at approximately one half the rate for simplex documents. However, it will be appreciated that there are other document sequencing alternatives.

One such alternative is to use a [known] type of inverter with a tri-roll or open nip which allows two sheets to be in the inverter nip(s) at the same time, overlapping or shingling, i.e., respectively going in and out of the inverter chute within overlapping time periods. That can provide duplex document scanning page sequences with less skips, and higher productivity, such as; 1, 3, 2, 4, skip, skip, 5, 7, 6, 8, skip, skip, etc.. However, an additional motor and rollers or a mechanism to open the nip would also be required. Also, opening and closing nips during CVT scanning may not be desirable for motion quality, timing, and/or other reasons. As may be seen, this alternative is not a directly sequential "immediate duplex" imaging algorithm, and thus electronic page buffering and page reordering is required.

Turning now to a separate disclosed feature which provides improved reliability; as described above, the platen 12 here is preferably in two separate portions, 12a and 12b. There is also provided here a platen gap 54 by a beveled platen edge 56 on the main or full size platen portion 12a end facing 12b, as shown. This provides a space or groove extending below the upper surface of the platen portion 12b into which a baffle lip or catch 52 may be desirably placed. That is, the baffle lip 52 extends below the upper surface of the platen portion 12b over which documents are being fed for imaging at the imaging station 16. This baffle lip 52 is closely adjacent but downstream of the imaging station 16. Thus, the lead edge of all documents fed through the imaging station 16 over the platen 12b upper surface are positively caught and deflected upwardly into the next feed nip (which is the second CVT nip 48 here). This overcomes a serious problem in previous attempts to use a regular platen glass surface for a CVT scanning station. Specifically, it is desired to positively feed the sheet with angled entrance nips from upstream CVT feed rolls 47 into direct contact with, and then sliding across, the platen glass surface, at the imaging station 16. This makes it very difficult to remove the document from the platen glass surface, especially with high sheet beam strengths or under low humidity conditions where high static adhesion forces may occur between the document and the platen glass, even with antistatic coatings. With this disclosed system, the lead edge is positively captured by the extending fingers or lip of the lower baffle 52, which is always below or underneath the lead edge of the document in this arrangement. Yet, as noted, there is not a substantial increase in cost, since the same mounting frame, in the same plane, is used for both of the platen glass portions 12a and 12b here. [Such platen mountings are well known for copier platens or scanner platens, and need not be illustrated herein.]

Although the catch lip or baffle 52 is shown here as a part of, and thus liftable with, the entire DH 10 unit, it does not have to be. That is, it may for example be a plastic shim adhered to the beveled platen edge 56, extending above and below the platen upper (imaging) surface surface. Or, such a baffle may be provided in addition to, in parallel or shingled with, a baffle 52 or shorter version thereof. The baffle 52 may have a solid portion ending above the platen surface, and a connecting or shingled flexible extending flap edge or lip thereof extending down into the inter-platens gap or notch, to allow for compensation for misalignment between the (pivotal) document handler 10 and the platen.

The beveled platen edge 56 is not essential for providing this slight gap 54 between the two platen portions allowed for this extending therebetween of the baffle lip 52. However, it desirably allows the bottom edges of the two platen portions 12a and 12b to be much more closely adjacent, or even to directly contact one another as shown. That is, the bevel 56 provides a sufficient notch or space below the upper surface of the two platens for the baffle of 52, but can close the gap therebetween at the bottom thereof, as shown. Thus, the bottom of the gap 54 can be effectively closed or sealed by abutment so that contaminants such as paper lint or liquids cannot fall down on the optical cavity below the platen on which the RIS 14 is operating. Such lower abutting surfaces of the platen portions 12a and 12b may also be positively sealed together, e.g., with double backed adhesive foam tape, or or other sealants.

An additional advantage of this split but immediately adjacent platen 12a, 12b arrangement is that if the CVT imaging station 16 platen 12b imaging surface becomes scratched or worn from documents and contaminants sliding thereover, only that minor portion 12b of the platen 12 need be replaced. There is no optical effect on documents being imaged by scanning on the more expensive large platen portion 12a, and thus no need to replace that portion. This is especially important if there is a single nip CVT system, in which the roller 47 over the platen is driven, an alternative further discussed elsewhere herein. In that case, the sheet driving portions of the roller 47 [or other sheet drive] may rotatably rub directly against the platen glass at times when a document sheet is not in that (imaging) nip, as well as pressing at least a portion of the moving documents against the upper platen surface during imaging. That can cause increased scratching or wear of the upper surface of the platen at imaging station 16.

The replacement life of even the platen portion 12b can be further extended by locating the imaging station 16 or the platen portion 12b so that the imaging station 16 is eccentric (off-center of) the platen portion 12b. Thus, the platen portion 12b can simply be lifted up from its mounting, turned around, and reset, to present a new, unworn, imaging station 16 window without requiring replacement with an new platen glass piece. Furthermore, it is believed that two more imaging station replacements [four in total] can be provided in that case with the same small piece of glass by turning it over, so that the scratched or worn upper surface of 12b becomes the bottom surface. Thus, due to the thickness of the glass relative to the focal length of the RIS 14, the worn area is not in the image plane (is out of focus) and thus not substantially affecting image quality, especially for a very short focal length RIS 14, as here.

In summary, the CVT imaging station 16 disclosed in this example is (desirably) a narrow glass platen 12b scanning slit in the same plane and general area as the regular large manual or stationary document scanning platen 12a. As shown, this can desirably be provided by a dual area or split platen, commonly mounted as one, in a common plane. They can thus both share the same imager or RIS 14 simply by moving it over in the same plane to the CVT scan park position at imaging station 16. Because both platen portions are in the same plane, and desirably of the same thickness, their upper surfaces are in a single common imaging plane, and their bottom surfaces are also in one plane, and thus may be used to align or space the RIS unit from the imaging plane for both the scanning and CVT imaging stations and modes, i.e., at and with the same RIS focal length. Also, the two document trays 20 and 22 can, as a unit, overly the manual platen area 12a, as shown, for overall compactness.

In summary, there is also disclosed here a beveled edge 56 on at least one side of one of the platen glass sections [just downstream of the CVT scan park position] so that the downstream return or lift baffle 52 for the CVT makes a positive (below the platen level) catch and return of all the document lead edges. That is, a bevel 56 is formed on the platen end running lengthwise to the document feeding direction. There has been a problem with prior CVT's in trying to capture and feed documents back off of the regular large manual or stationary document scan platen [vs. undesirably requiring a separate imaging station with a separate narrow window or slot]. This arrangement solves that problem, to substantially reduce jam possibilities.

The exemplary RIS 14 here may be, e.g., a diode type full width array of a conventional type for high resolution, scanning closely under the platen. It may use the well known integral fiber optic "selfoc" lenses. As noted, here the same RIS 14 may be "parked" for CVT input at an imaging station 16 which may be at one end of a single linear scan track which is only a slight extension of the same scan path used for the main platen 12a scanning system, thus saving space and minimizing components.

While a known system of temporarily stalled document lead edge registration rolls 44 (temporarily stopped nip sheet deskew system) is shown in this example, it will be appreciated that a conventional moving gate system may be used instead, with the gate positioned just ahead of that nip. The lead edge of the sheet may be similarly fed up to and held against the gate fingers while they are in the sheet path, until the sheet is slightly buckled, and until the time for the sheet to be fed. Then the gate fingers may be lifted, e.g., by a solenoid or cam. In such an alternative deskew system, the motor M2 may be used to continuously drive what is presently the stalled rolls 44 nip. Motor M1 would then only drive the sheet feeder 30 and the take-away nip 42.

The sheet path gate or diverter 49 adjacent the reversible exit rolls 50 for duplex documents being reversed may be a conventionally solenoid pivoted gate. However, alternatively this may be a one-way gravity gate, or a similarly functioning thin mylar spring flap gate, known per se in document handling, e.g. Xerox Corp. U.S. Pat. No. 4,884,794, ref. 68, Col. 12, and Canon U.S. Pat. No. 4,627,709, Col. 6.

Another alternative would be to provide at 49 a known 2-sided gate, or an additional diverter gate, so that direct document recirculation directly into path 27, bypassing rollers 50 (i.e., without any inverter usage), could alternatively be provided. This could be used, for example, to allow and provide for a document "prescan" before re-imaging the same side, or an automatic re-imaging pass in the event of an electronically detected defective first scan pass. Or, for example, to allow corrective image editing before a second pass of an image displayed on a screen after a first imaging pass. For example, if software is not provided to automatically recognize and electronically fill in or white-out the punch holes in documents with 3-ring or other holes in a first pass, which holes can undesirably image as large black dot areas on the copies if they are imaged against an optically black background.

It will be noted that the document path here does not need to have any active document side registration [transverse the feed direction], even before second side imaging, because any lateral misregistration may be digitally corrected. That is a known technique, e.g., simply by detecting the side edges of the document and counting the pixels of the full width scanner 14 array outside the document sheet edge area. Document edge detection can be enhanced by use of a spectral (mirror), superwhite, black, colored or other non-white image scanning background, e.g., on the surface of roller 47, and/or an associated baffle, at least in those areas in which document edges are being detected.

While the embodiment disclosed herein is preferred, it will be appreciated from this teaching that various alternatives, modifications, variations or improvements therein may be made by those skilled in the art, which are intended to be encompassed by the following claims.

What is claimed is:

1. In a document handler for sequentially feeding document sheets stacked in an input tray to be imaged at an imaging station and to an output tray for restacking the document sheets after they have been imaged, said document handler providing a document feeding path from said input tray to said imaging station and to said output tray, and said document feeding path further including a duplex document feeding path for returning duplex document sheets imaged on their first sides back to said imaging station for imaging their second sides, the improvement wherein:

said document feeding path includes a dual mode reversible output sheet feeder which in a first mode feeds out document sheets fully into said output tray, and, in a second mode, feeds a duplex document sheet substantially out over said output tray and then reverses to refeed the duplex document sheet into said document feeding path via said duplex feeding path;

said input tray and said output tray are in a space saving closely superposed relationship defining a protective confining inverter chute space between said input and output trays within which the duplex document sheets are fed by said dual mode reversible output sheet feeder substantially out over said output tray and then reversed to feed the duplex document sheets into said duplex document feeding path;

wherein said document feeding path comprises a highly compact "U" shaped document sheet path with its entrance adjacent said input tray and its exit adjacent said output tray;

wherein said "U" shaped document sheet path is not substantially longer than the longest document sheet to be fed therethrough and has its entrance adjacent to said input tray and its exit at said output tray.

2. The document handler of claim 1 wherein said duplex document sheet feeding path comprises said same compact "U" shaped document feeding path, and an additional short interconnecting duplex document sheet path from said dual mode reversible output sheet feeder to said entrance of said "U" shaped document sheet path.

3. The document handler of claim 2 wherein, in said second mode of said dual mode reversible output sheet feeder, duplex document sheets imaged on their first sides are reversed and fed back in from in between said input tray and said output tray into said short interconnecting duplex document sheet path to said "U" shaped document sheet path entrance before being imaged on their second sides at said imaging station.

4. In a document handler for sequentially feeding document sheets stacked in an input tray to be imaged at an imaging station and to an output tray for restacking the document sheets after they have been imaged, said document handler providing a document feeding path from said input tray to said imaging station and to said output tray, and said document feeding path further including a duplex document feeding path for returning duplex document sheets imaged on their first sides back to said imaging station for imaging their second sides, the improvement wherein:

said document feeding path includes a dual mode reversible output sheet feeder which in a first mode feeds out document sheets fully into said output tray, and, in a second mode, feeds a duplex document sheet substantially out over said output tray and then reverses to refeed the duplex document sheet into said document feeding path via said duplex feeding path;

said input tray and said output tray are in a space saving closely superposed relationship defining a protective confining inverter chute space between said input and output trays within which the duplex document sheets are fed by said dual mode reversible output sheet feeder substantially out over said output tray and then reversed to feed the duplex document sheets into said duplex document feeding path;

wherein said document feeding path comprises a highly compact "U" shaped document sheet path with its entrance adjacent said input tray and its exit adjacent said output tray, wherein said "U" shaped document sheet path is only slightly longer than approximately 43 cm.

5. In a document handler for sequentially feeding document sheets stacked in an input tray to be imaged at an imaging station and to an output tray for restacking the document sheets after they have been imaged, said document handler providing a document feeding path from said input tray to said imaging station and to said output tray, and said document feeding path further including a duplex document feeding path for returning duplex document sheets imaged on their first sides back to said imaging station for imaging their second sides, the improvement wherein:

said document feeding path includes a dual mode reversible output sheet feeder which in a first mode feeds out document sheets fully into said output tray, and, in a second mode, feeds a duplex document sheet substantially out over said output tray and then reverses to refeed the duplex document sheet into said document feeding path via said duplex feeding path;

said input tray and said output tray are in a space saving closely superposed relationship defining a protective confining inverter chute space between said input and output trays within which the duplex document sheets are fed by said dual mode reversible output sheet feeder substantially out over said output tray and then reversed to feed the duplex document sheets into said duplex document feeding path;

wherein duplex documents are fed through said document feeding path three times before ejecting collated into said output tray.

6. The document handler of claim 5, further including a top sheet feeder/separator for feeding the uppermost of the stacked document sheets in said input tray sequentially into said document feeding path; and wherein said document sheets are stacked in said input tray face-up, and are fed by said feeder/separator in forward serial order into said document feeding path, for electronic imaging in forward serial order at said imaging station; and wherein the document sheets so fed are restacked in collated order in said output tray.

7. The document handler of claim 5, in which said imaging station is a minor end portion, in the same plane, of a full document size platen on which documents may be stationarily placed and scanned by moving an image scanner relative thereto, and wherein said same image scanner is moved to and stationarily positioned at said imaging station for imaging the document sheets fed by said document handler at said minor end portion of said full document size platen.

8. The document handler of claim 7, wherein substantially all of said document handler compactly overlies said full document size platen.

9. In a document handler for sequentially feeding document sheets stacked in an input tray to be imaged at an imaging station and then to an output tray for restacking the document sheets after they have been imaged, said document handler providing a document feeding path from said input tray to said imaging station and to said output tray, said document feeding path further providing a duplex document feeding path for returning duplex document sheets imaged on their first sides back to said imaging station for imaging their second sides, said document feeding path including a dual mode reversible output sheet feeder which in a first mode feeds out document sheets fully into said output tray, and, in a mode, feeds a duplex document sheet substantially out over said output tray and then reverses to refeed the duplex document sheet into said document feeding path ;the improvement wherein:

said input and output trays are substantially parallel to one another and closely vertically stacked one above the other with said input tray closely overlying said output tray with only a small vertical space therebetween to define in said small vertical space between said input tray and said output tray a protective confining inverter chute confining therein said duplex document sheets being fed by said dual mode reversible output sheet feeder in said second mode substantially out over said output tray and then reversed to feed the duplex document sheets into said duplex document feeding path;

and wherein said dual mode reversible output sheet feeder is vertically spaced between said input tray and said output tray and above the level of said output tray and adjacent to the entrance to said output tray.

10. The document handler of claim 9, wherein said input tray and said output tray are both substantially horizontal.

11. The document handler of claim 9, further including a full document size planar document platen in the same plane as said imaging station, on which documents may be stationarily placed, and further including an image scanner movable parallel to said plane relative to said full document size platen and stationarily positionable at said imaging station, and wherein said said input tray and said output tray are both in a space saving relationship vertically overlying said full document size planar document platen.

12. The document handler of claim 9, wherein said duplex documents are fed through said document feeding path three times before ejecting collated into said output tray.

* * * * *